United States Patent
Kataoka et al.

(10) Patent No.: US 11,139,504 B2
(45) Date of Patent: Oct. 5, 2021

(54) LITHIUM ION CONDUCTIVE CRYSTAL BODY AND ALL-SOLID STATE LITHIUM ION SECONDARY BATTERY

(71) Applicant: NATIONAL INSTITUTE OF ADVANCED INDUSTRIAL SCIENCE AND TECHNOLOGY, Tokyo (JP)

(72) Inventors: Kunimitsu Kataoka, Tsukuba (JP); Junji Akimoto, Tsukuba (JP)

(73) Assignee: NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 17 days.

(21) Appl. No.: 16/897,119

(22) Filed: Jun. 9, 2020

(65) Prior Publication Data

US 2020/0303771 A1     Sep. 24, 2020

Related U.S. Application Data

(62) Division of application No. 15/517,125, filed as application No. PCT/JP2015/080825 on Oct. 30, 2015, now abandoned.

(30) Foreign Application Priority Data

Oct. 31, 2014  (JP) ................................ 2014-223346

(51) Int. Cl.
  *H01M 10/0562*   (2010.01)
  *H01M 10/0525*   (2010.01)
  (Continued)

(52) U.S. Cl.
  CPC ........ *H01M 10/0562* (2013.01); *C01G 25/00* (2013.01); *C01G 25/006* (2013.01);
  (Continued)

(58) Field of Classification Search
  CPC ................................................ H01M 10/0562
  See application file for complete search history.

(56) References Cited

U.S. PATENT DOCUMENTS

2007/0148553 A1   6/2007  Weppner
2014/0150961 A1   6/2014  Hama et al.
(Continued)

FOREIGN PATENT DOCUMENTS

JP       2011195373 A     10/2011

OTHER PUBLICATIONS

Thangahurai, Venkataraman, Novel Fast Lithium Ion Conduction in Garnet-Type Li5La3M2O12 (M= Nb, Ta) (Year: 2003).
(Continued)

*Primary Examiner* — Brian R Ohara
(74) *Attorney, Agent, or Firm* — Studebaker & Brackett PC

(57) ABSTRACT

To provide a lithium ion conductive crystal body having a high density and a large length and an all-solid state lithium ion secondary battery containing the lithium ion conductive crystal body. A $Li_5La_3Ta_2O_{12}$ crystal body, which is one example of the lithium ion conductive crystal body, has a relative density of 99% or more, belongs to a cubic system, has a garnet-related type structure, and has a length of 2 cm or more. The $Li_5La_3Ta_2O_{12}$ crystal body is grown by a melting method employing a $Li_5La_3Ta_2O_{12}$ polycrystal body as a raw material. With the growing method, a $Li_5La_3Ta_2O_{12}$ crystal body having a relative density of 100% can also be obtained. In addition, the all-solid state lithium ion secondary battery has a positive electrode, a negative electrode, and a solid electrolyte, in which the solid electrolyte contains the lithium ion conductive crystal body.

5 Claims, 7 Drawing Sheets

(51) Int. Cl.

| | |
|---|---|
| *H01M 10/0585* | (2010.01) |
| *H01B 1/08* | (2006.01) |
| *H01B 1/12* | (2006.01) |
| *C01G 25/00* | (2006.01) |
| *C01G 35/00* | (2006.01) |

(52) U.S. Cl.
CPC ........... *C01G 35/00* (2013.01); *C01G 35/006* (2013.01); *H01B 1/08* (2013.01); *H01B 1/122* (2013.01); *H01M 10/0525* (2013.01); *H01M 10/0585* (2013.01); *C01P 2002/30* (2013.01); *C01P 2002/50* (2013.01); *C01P 2002/76* (2013.01); *C01P 2002/77* (2013.01); *C01P 2004/02* (2013.01); *C01P 2006/40* (2013.01); *H01M 2300/0071* (2013.01); *Y02P 70/50* (2015.11)

(56) References Cited

U.S. PATENT DOCUMENTS

| | | |
|---|---|---|
| 2014/0308590 A1 | 10/2014 | Ohta et al. |
| 2017/0047589 A1 | 2/2017 | Noi et al. |

OTHER PUBLICATIONS

Yutao, Preparation, Properties and Mechanism of Garnet type and NASICON type solid electrolyte, Chinese Doctora Dissertation Full-text Database Engineering science and technology, Part I, vol. 7, B015-18, Section 3.1, 3.2.4, 3.3, 3.3.2 of chapter 3, Section 1.2, 1.3 of chapter 1,Tsinqhua University, Beijinq, China, Jul. 15, 2014, in Chinese (51 paqes).

Yutao, Preparation, Properties and Mechanism of Garnet type and NASICON type solid electrolyte, Chinese Doctora Dissertation Full-text Database Engineering science and technology, Part I, vol. 7, B015-18, Section 3.1, 3.2.4, 3.3, 3.3.2 of chapters, Section 1.2, 1.3 of chapter 1, Tsinghua University, Beijing, China, Jul. 15, 2014, English Translation of Abstract Only (2 pages).

English Machine Text Translation and Abstract of Japanese Patent Application No. 2011195373 A, Published on Oct. 6, 2011, National Institute of Advanced Industrial Science & Technology; 16 pages.

LITHIUM ION CONDUCTIVE CRYSTAL BODY AND ALL-SOLID STATE LITHIUM ION SECONDARY BATTERY

CROSS-REFERENCE TO RELATED APPLICATIONS

This application is a Divisional of U.S. patent application Ser. No. 15/517,125 filed Apr. 5, 2017, which is the U.S. National Stage of International Application No. PCT/JP2015/080825 filed on Oct. 30, 2015, which claims benefit of priority to Japanese Patent Application No. 2014-223346 filed Oct. 31, 2014, the entire content of which is incorporated herein by reference.

TECHNICAL FIELD

The present invention relates to a high-density lithium ion conductive crystal body and an all-solid state lithium ion secondary battery containing the lithium ion conductive crystal body as a solid electrolyte.

BACKGROUND ART

Since the energy density is high and operation at a high potential is achieved as compared with secondary batteries, such as a nickel-cadmium battery and a nickel-hydride battery, a lithium ion secondary battery has been widely used for small information devices, such as a cellular phone and a notebook PC. In recent years, since a reduction in size and weight is easily achieved, a demand as a secondary battery for hybrid vehicles and electric vehicles has increased. Considering safety, an all-solid state lithium ion secondary battery containing no flammable electrolytic solution has been researched and developed. A solid electrolyte for use in the all-solid state lithium ion secondary battery has been required to have high ion conductivity.

As an oxide having high lithium ion conductivity, $Li_{7.1}La_{3.1}Zr_{0.9}O_{12}$ having a cubic garnet-related type crystal structure produced by a high temperature sintering method is known (Patent Document 1). However, according to the high temperature sintering method, only a crystal body having a diameter of about several tens to several hundreds of μm is obtained. The crystal body of this size cannot be used as a solid electrolyte of all-solid state lithium ion secondary battery products. For the application to all-solid state lithium ion secondary battery products, a lithium ion conductive crystal body is required which has an area equal to or larger than a circle having a diameter of about 1 cm and which can be formed into a thin piece in order to reduce an electrical resistance value.

CITATION LIST

Patent Document

Patent Document 1: Japanese Unexamined Patent Application Publication No. 2011-195373

SUMMARY

Technical Problem

The present invention has been made in view of such circumstances. It is an object of the present invention to provide a lithium ion conductive crystal body having a high-density and a large length and an all-solid state lithium ion secondary battery containing the lithium ion conductive crystal body as a solid electrolyte.

Solution to Problem

The present inventors have considered that high-density $Li_{7-3x}Al_xLa_3Zr_2O_{12}$ (0.05<x<0.50), $Li_5La_3Ta_2O_{12}$, and $Li_6BaLa_2Ta_2O_{12}$ crystal bodies in which no grain boundary is present are obtained by conceiving a method for producing a crystal body, so that the above-described problem can be solved. Then, as a result of extensively examining a method for producing a crystal body including melting a polycrystal body sample at a high temperature, and then cooling the same, the present inventors have confirmed that $Li_{7-3x}Al_xLa_3Zr_2O_{12}$ (0.05<x<0.50), $Li_5La_3Ta_2O_{12}$, and $Li_6BaLa_2Ta_2O_{12}$ crystal bodies having a high-density and a garnet-related type structure can be grown and these crystal bodies can be mechanically formed into a thin piece, and thus have completed the present invention.

The chemical composition of the lithium ion conductive crystal body of the present invention is represented by $Li_{7-3x}Al_xLa_3Zr_2O_{12}$ (0.05<x<0.50), $Li_5La_3Ta_2O_{12}$, or $Li_6BaLa_2Ta_2O_{12}$, has a relative density of 99% or more, belongs to a cubic system, has a garnet-related type structure, and has a length of 2 cm or more.

A method for producing a lithium ion conductive crystal body of the present invention is a method for producing a lithium ion conductive crystal body having a chemical composition represented by $Li_{7-3x}Al_xLa_3Zr_2O_{12}$ (0.05<x<0.50), $Li_5La_3Ta_2O_{12}$, or $Li_6BaLa_2Ta_2O_{12}$, having a relative density of 99% or more, belonging to a cubic crystal system, and having a garnet-related type structure, and the method includes a process of melting at least a part of a raw material of a polycrystal represented by the same chemical composition as that of the lithium ion conductive crystal body to form a melted portion, and then moving the melted portion at a movement speed of 8 mm/h or more.

A method for producing another lithium ion conductive crystal body of the present invention is a method for producing a lithium ion conductive crystal body having a chemical composition represented by $Li_{7-3x}Al_xLa_3Zr_2O_{12}$ (0.05<x<0.50), having a relative density of 99% or more, belonging to a cubic crystal system, and having a garnet-related type structure, and the method includes a process of melting at least a part of a raw material containing a polycrystal body having a chemical composition represented by $Li_7La_3Zr_2O_{12}$, belonging to a tetragonal crystal system, and having a garnet-related type structure and at least one of an $Al_2O_3$ polycrystal body and a $LiAlO_2$ polycrystal body to form a melted portion, and then moving the melted portion at a movement speed of 8 mm/h or more.

An all-solid state lithium ion secondary battery of the present invention has a positive electrode, a negative electrode, and a solid electrolyte, in which the solid electrolyte contains the lithium ion conductive crystal body of the present invention.

Advantageous Effects of Invention

According to the present invention, a lithium ion conductive crystal body having a high-density and a large length and an all-solid state lithium ion secondary battery containing the lithium ion conductive crystal body as a solid electrolyte are obtained.

DESCRIPTION OF EMBODIMENT

Figure 1:
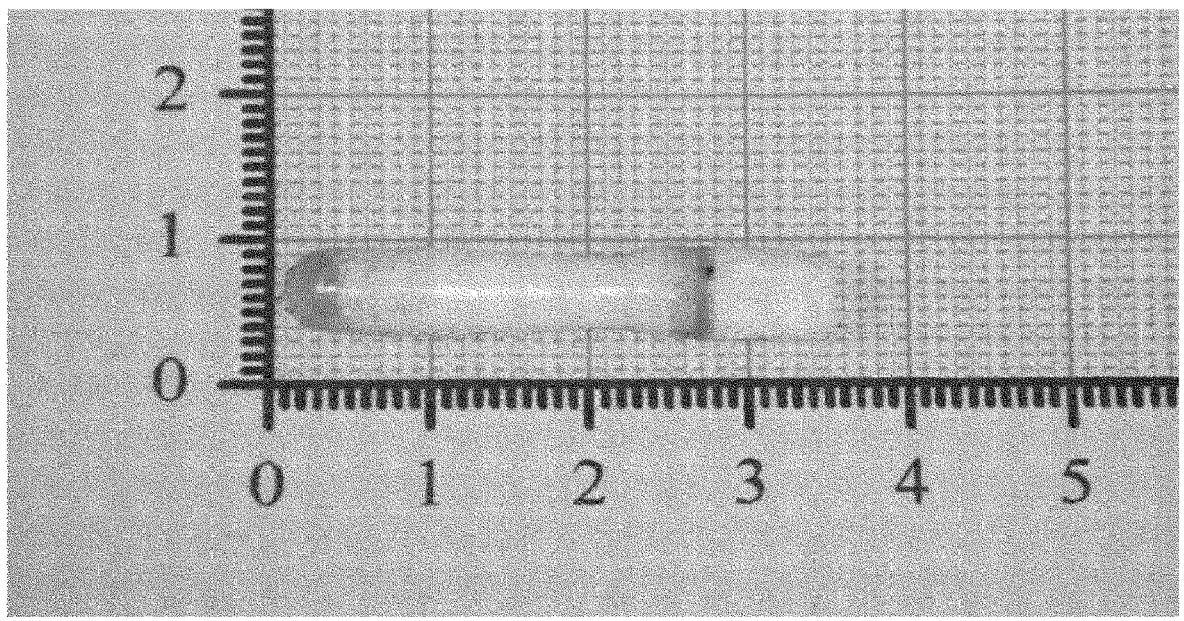
FIG. 1 is a photograph of the appearance of a cubic system $Li_{6.46}Al_{0.18}La_3Zr_2O_{12}$ crystal body obtained in Examples.

Hereinafter, a lithium ion conductive crystal body, a method for producing $Li_5La_3Ta_2O_{12}$, $Li_6BaLa_2Ta_2O_{12}$, and $Li_{7-3x}Al_xLa_3Zr_2O_{12}$ crystal bodies, and an all-solid state lithium ion secondary battery of the present invention are described in detail based on Embodiment and Examples. An overlapped description is omitted as appropriate.

The present inventors have found that, by molding polycrystalline powder of $Li_5La_3Ta_2O_{12}$ and $Li_6BaLa_2Ta_2O_{12}$ into a rod shape, and then melting and rapidly cooling the rod-shaped polycrystal body by a floating zone (FZ) method employing infrared ray converging heating, a crystal body having high-density and a large length can be produced, and then have completed the present invention. A lithium ion conductive crystal body according to an embodiment of the present invention has a chemical composition represented by $Li_{7-3x}Al_xLa_3Zr_2O_{12}$ (0.05<x<0.50), $Li_5La_3Ta_2O_{12}$, or $Li_6BaLa_2Ta_2O_{12}$, has a relative density of 99% or more, belongs to a cubic system, and has a garnet-related type structure. In this embodiment, the length of the ion conductive crystal body is 2 cm or more.

The relative density is calculated by measuring the outer shape of a produced thin piece, calculating the apparent volume, and then dividing the apparent density calculated from the measurement mass by a true density obtained from a single crystal X-ray structure analysis result. The lithium ion conductive crystal body of this embodiment having a higher relative density is more preferable. In the lithium ion conductive crystal body of this embodiment, all crystal domains do not need to face in the same direction.

The high-density lithium ion conductive crystal body has high strength, and therefore can be easily cut into an arbitrary thickness with a diamond cutter or the like. For example, a thin piece having a thickness of about 0.1 mm can be mechanically produced. A lithium ion conductive crystal body having a relative density of 100%, i.e., an original lithium ion conductive single crystal body, is particularly excellent in lithium ion conductivity. When a ratio where the crystal domains of the lithium ion conductive crystal body are aligned in the same direction is high, diffraction spots are observed as clear points in the X-ray diffraction measurement using a single crystal.

In a lithium ion conductive crystal body in which the directions of the crystal domains of are not aligned, diffraction spots are complicated or the diffractions from various domains are overlapped, so that the diffraction spots are close to a ring shape. The crystal body was produced by moving a melted portion at 10 mm/h in the FZ method. Therefore, the cooling rate of the melted portion increases, so that growing cannot be performed in such a manner that the directions of the crystal domains are always uniform in the crystal body.

The lithium ion conductive crystal body of this embodiment satisfies at least one of (1) and (2) below: (1) the Nyquist plot by alternative current impedance measurement does not show a resistance component due to a grain boundary but shows only a resistance component of the material itself; and (2) a diffraction spot appears in a diffraction pattern in X-ray diffraction measurement, neutron diffraction measurement, or electron diffraction measurement using a single crystal. The diffraction spot sometimes appears only in a spot shape or sometimes appears in a spot shape and a ring shape.

The lithium ion conductive crystal body of this embodiment is produced by melting at least a part of a raw material of a polycrystal body to form a melted portion, and then moving the melted portion at a movement speed of 8 mm/h or more. Specifically, the lithium ion conductive crystal body is grown by a floating zone (FZ) method, a Czochralski (CZ) method, a Bridgman method, a Pedestal method, and the like. A suitable method may be selected from these methods according to the size, shape, and the like of a lithium ion conductive crystal body to be produced.

The lithium ion conductive crystal body of this embodiment may be grown by a melting method employing a polycrystal body represented by the same chemical composition as a raw material. More specifically, a $Li_{7-3x}Al_xLa_3Zr_2O_{12}$ (0.05<x<0.50) crystal body is grown by a melting method employing a $Li_{7-3x}Al_xLa_3Zr_2O_{12}$ (0.05<x<0.50) polycrystal body as a raw material, a $Li_5La_3Ta_2O_{12}$ crystal body is grown by a melting method employing a $Li_5La_3Ta_2O_{12}$ polycrystal body as a raw material, and a $Li_6BaLa_2Ta_2O_{12}$ crystal body is grown by a melting method employing a $Li_6BaLa_2Ta_2O_{12}$ polycrystal body as a raw material.

The lithium ion conductive crystal body having a chemical composition represented by $Li_{7-3x}Al_xLa_3Zr_2O_{12}$ (0.05<x<0.50), having a relative density of 99% or more, belonging to a cubic system, and having a garnet-related type structure may be grown by melting at least a part of a raw material containing a polycrystal body having a chemical composition represented by $Li_7La_3Zr_2O_{12}$, belonging to a tetragonal system, and having a garnet-related type structure and at least one of an $Al_2O_3$ polycrystal body and a $LiAlO_2$ polycrystal body to form a melted portion, and then moving the melted portion at a movement speed of 8 mm/h or more.

In the case of producing the lithium ion conductive crystal body of this embodiment by the FZ method, a part of a rod-shaped polycrystal body raw material is melted while being rotated on a plane perpendicular to the longitudinal direction, and then moving the melted portion in the longitudinal direction to thereby grow the lithium ion conductive crystal body. By setting the movement speed of the melted portion to be as high as 8 mm/h or more, the decomposition of the raw material involved in the volatilization of the lithium is avoided. The movement speed of the melted portion is preferably 8 mm/h or more and 19 mm/h or less. In the melted portion, the lithium tends to volatilize, so that air bubbles are generated. However, the air bubbles can be removed by setting the rotation speed of the rod-shaped polycrystal body raw material to be as high as 30 rpm or more. The rotation speed of the raw material is preferably 30 rpm or more and 60 rpm or less.

It is preferable to perform the melting of the raw material and the movement of the melted portion in a dry air atmosphere. Thus, the lithium ion conductive crystal body having a relative density of 99% or more can be produced. A method for producing a lithium ion conductive crystal body is described taking the growing of a $Li_5La_3Ta_2O_{12}$ crystal body having a relative density of 99% or more, belonging to a cubic system, having a garnet-related type structure, and having a length of 2 cm or more as an example.

First, a rod-shaped $Li_5La_3Ta_2O_{12}$ polycrystal body raw material is produced as follows. More specifically, a lithium compound, a lanthanum compound, and a tantalum compound are weighed so that Li:La:Ta is 6-7:3:2 in terms of a molar ratio considering the fact that the lithium is volatilized at a high temperature. The lithium compound is not particularly limited insofar as lithium is contained, and $Li_2O$, $Li_2CO_3$, and the like are mentioned. The lanthanum compound is not particularly limited insofar as lanthanum is contained and $La_2O_3$, $La(OH)_3$, and the like are mentioned. The tantalum compound is not particularly limited insofar as tantalum is contained and $Ta_2O_5$, $TaCl_5$, and the like are mentioned. Using a compound containing two or more kinds of lithium, lanthanum, and tantalum, e.g., $LaTaO_4$, $LiTaO_3$, or the like, the compound may be weighed so that Li:La:Ta is 6-7:3:2 in terms of a molar ratio.

Next, the weighed compounds are mixed. A mixing method is not particularly limited insofar as these compounds can be uniformly mixed, and these compounds may be mixed by a wet method or a dry method using mixing devices, such as a mixer, for example. Then, the obtained mixture is charged into a crucible with a cover, and then calcined at 900° C. to 1000° C. and preferably 930° C. to 990° C., whereby polycrystal body powder serving as a raw material is obtained. It is more preferable to repeat pulverization, mixing, and baking of the once-calcined product again. The polycrystal body powder belongs to the cubic system.

Next, in order to facilitate molding, the obtained polycrystal body powder is pulverized to reduce the particle size. A pulverization method is not particularly limited insofar as the powder can be pulverized and, for example, the powder may be pulverized by a wet method or a dry method using a pulverization device, such as a planetary ball mill, a pot mill, or a bead mill. Then, the obtained pulverized substances are charged into a rubber tube, and then molded into a rod shape by a hydrostatic press. Next, the obtained molded substance is baked at about 800° C. to 1300° C. and preferably 900° C. to 1100° C., whereby a rod-shaped $Li_5La_3Ta_2O_{12}$ polycrystal body raw material is obtained. The rod-shaped polycrystal body raw material belongs to the cubic system.

Then, the rod-shaped polycrystal body raw material is melted in an infrared ray converging heating furnace, and then rapidly cooled, whereby a $Li_5La_3Ta_2O_{12}$ crystal body having a relative density of 99% or more, having the garnet-related structure, and having a length of 2 cm or more is produced. The $Li_5La_3Ta_2O_{12}$ crystal body to be produced belongs to the cubic system. Thus, a $Li_5La_3Ta_2O_{12}$ crystal body having a high-density and a large length can be produced. A $Li_5La_3Ta_2O_{12}$ crystal body having a relative density of 100% can also be produced. The grating constant a of the lithium ion conductive crystal body of this embodiment is 1.28 nm≤a≤1.31 nm.

When producing the $Li_5La_3Ta_2O_{12}$ crystal body by the CZ method, the production is performed by the following procedure. First, a $Li_5La_3Ta_2O_{12}$ polycrystal body as a raw material is placed in a crucible, and then heated for melting. Next, a seed crystal is dipped in a melt of the raw material, and then pulled up while rotating. It is considered that, by setting the movement speed of the melted portion, i.e., the pull-up speed of the seed crystal, to be as high as 8 mm/h or more, the volatilization of the lithium is prevented, and a high-density $Li_5La_3Ta_2O_{12}$ crystal body is obtained. The lithium ion conductive crystal body of this embodiment has a length of 2 cm or more. Therefore, thin pieces having the same quality can be easily produced by cutting.

A method for producing a $Li_{7-3x}Al_xLa_3Zr_2O_{12}$ (0.05<x<0.50) crystal body is the same as the method for producing the $Li_5La_3Ta_2O_{12}$ crystal body. An aluminum compound serving as a raw material is not particularly limited insofar as Al is contained and $Al_2O_3$, $LiAlO_2$, and the like are mentioned. A zirconium compound serving as a raw material is not particularly limited insofar as zirconium is contained and $ZrO_2$, $ZrCl_4$, $La_2Zr_2O_7$, $Li_2ZrO_3$, and the like are mentioned. A method for producing a $Li_6BaLa_2Ta_2O_{12}$ crystal body is the same as the method for producing the $Li_5La_3Ta_2O_{12}$ crystal body. A barium compound serving as a raw material is not particularly limited insofar as barium is contained and $BaCO_3$, $BaO$, and the like are mentioned.

The lithium ion conductive crystal body of the present invention is excellent in lithium ion conductivity, and therefore is usable for a solid electrolyte of an all-solid state lithium ion secondary battery. More specifically, an all-solid state lithium ion secondary battery of the present invention has a positive electrode, a negative electrode, and a solid electrolyte, in which the solid electrolyte contains the lithium ion conductive crystal body of the present invention. The solid electrolyte is a high-density lithium ion conductive crystal body, and therefore, in an all-solid state lithium battery in which a negative electrode is metallic lithium, a short circuit due to penetration of the metallic lithium in charge/discharge can be prevented. Moreover, the solid electrolyte can be formed into a thin piece, and therefore the energy density per unit mass of the battery can be increased.

EXAMPLES

Example 1

Production of $Li_{6.46}Al_{0.18}La_3Zr_2O_{12}$ Crystal Body (Production of $Li_7La_3Zr_2O_{12}$ Polycrystal Body Powder)

First, 10.6861 g of lithium carbonate $Li_2CO_3$ (manufactured by RARE METALLIC Co., LTD., Purity of 99.99%), 16.8280 g of lanthanum oxide $La_2O_3$ (manufactured by RARE METALLIC Co., LTD., Purity of 99.99%), and 8.4859 g of zirconium dioxide $ZrO_2$ (manufactured by RARE METALLIC Co., LTD., Purity of 99.99%) as starting materials were placed in an agate mortar, and then uniformly mixed by a wet method employing ethanol. For the lanthanum oxide, one which was calcined at 900° C. beforehand was used.

As the molar ratio Li:La:Zr of the metals of the mixture, lithium is 20 mol % excessive as compared with the stoichiometric ratio of $Li_7La_3Zr_2O_{12}$ which is a target substance. More specifically, as the quantity, the chemical composition is equivalent to $Li_{8.4}La_3Zr_2O_{12}$. Next, 36 g of the mixture was charged into an alumina crucible with a cover (manufactured by NIKKATO CORPORATION, C5 type). Then, the crucible was placed in a box type electric furnace (manufactured by YAMATO SCIENTIFIC CO., LTD., FP100 type), and then calcined at 950° C. for 5 hours, whereby powder was obtained. Next, the obtained powder was pulverized with the mortar, and then baked at 980° C. for 10 hours twice, whereby $Li_7La_3Zr_2O_{12}$ polycrystal body powder was produced.

(Production of Mixed Powder of $Li_7La_3Zr_2O_{12}$ Polycrystal Body and $Al_2O_3$ Polycrystal Body)

30 g of the $Li_7La_3Zr_2O_{12}$ polycrystal body powder obtained in the process above, 0.6 g of aluminum oxide $Al_2O_3$ (manufactured by RARE METALLIC Co., LTD., Purity of 99.99%) polycrystal body, 50 g of zirconia balls having a diameter of 5 mm, and 14 mL of ion exchanged water were charged into a pulverization container made from zirconia and having a capacity of 45 mL, and then rotated at a number of revolutions of 200 rpm for 300 minutes in total using a planetary ball mill (manufactured by Fritsch, Germany, Type P-6) to be pulverized. The polycrystal body powder after the pulverization was dried at 100° C. for 24 hours, and classified using a sieve having an opening of 250 μm to obtain mixed powder of the $Li_7La_3Zr_2O_{12}$ polycrystal body and the $Al_2O_3$ polycrystal body.

(Production of Rod-Shaped Mixture of $Li_7La_3Zr_2O_{12}$ Polycrystal Body and $Al_2O_3$ Polycrystal Body)

A rod-shaped mixture of the $Li_7La_3Zr_2O_{12}$ polycrystal body and the $Al_2O_3$ polycrystal body was produced using the mixed powder classified in the process above by the following procedure. First, 26 g of the mixed powder was charged into a rubber mold, followed by degassing. Next, the mold was placed in water in a state of being sealed, and then held at 40 MPa for 5 minutes. Then, the water pressure was reduced, and then the molded substance was taken out from the mold. The molded substance had a cylindrical shape having a diameter of 1.0 cm and a height of 4.8 cm. Next, the cylindrical molded substance was baked at 1150° C. for 8 hours using a box type electric furnace (manufactured by DENKEN Co., Ltd., Model Number KDF009). After the baking, 26 g of a mixture of the $Li_7La_3Zr_2O_{12}$ polycrystal body and the $Al_2O_3$ polycrystal body close to a column having a width of 0.8 cm and a height of 4 cm was obtained.

(Growing 1 of $Li_{6.46}Al_{0.18}La_3Zr_2O_{12}$ Crystal Body)

First, the rod-shaped mixture of the $Li_7La_3Zr_2O_{12}$ polycrystal body and the $Al_2O_3$ polycrystal body as the raw material obtained in the process above was disposed in a four ellipse-type infrared ray converging heating furnace (FZ furnace) (manufactured by Crystal System, FZ-T-10000H type) having a 1 kW halogen lamp, and then a dry air atmosphere was set.

Next, the raw material was heated at an output of 51.9% while being rotated at 45 rpm on a plane perpendicular to the longitudinal direction. After a while, a part of the raw material was melted to form a melted portion. Then, an installation stand on which the raw material was disposed was lowered at two movement speeds of 8 mm/h and 19 mm/h to grow a $Li_{6.46}Al_{0.18}La_3Zr_2O_{12}$ crystal body. The chemical composition of the crystal body was analyzed by X-ray crystal structure analysis. FIG. 1 illustrates a photograph of the appearance of the $Li_{6.46}Al_{0.18}La_3Zr_2O_{12}$ crystal body (hereinafter sometimes referred to as "sample 1") obtained at the lowering speed of 19 mm/h. As illustrated in FIG. 1, the length of the sample 1 was 2.3 cm.

(Production of Mixed Powder of $Li_7La_3Zr_2O_{12}$ Polycrystal Body and $LiAlO_2$ Polycrystal Body)

Mixed powder of a $Li_7La_3Zr_2O_{12}$ polycrystal body and a $LiAlO_2$ polycrystal body was produced in the same manner as the method for producing the mixed powder of the $Li_7La_3Zr_2O_{12}$ polycrystal body and the $Al_2O_3$ polycrystal body, except using 0.8 g of lithium oxide aluminum $LiAlO_2$ (manufactured by RARE METALLIC Co., LTD., Purity of 99.99%) polycrystal body in place of 0.6 g of the $Al_2O_3$ polycrystal body.

(Production of Rod-Shaped Mixture of $Li_7La_3Zr_2O_{12}$ Polycrystal Body and $LiAlO_2$ Polycrystal Body)

A rod-shaped mixture of the $Li_7La_3Zr_2O_{12}$ polycrystal body and the $LiAlO_2$ polycrystal body was produced in the same manner as the method for producing the rod-shaped mixture of the $Li_7La_3Zr_2O_{12}$ polycrystal body and the $Al_2O_3$ polycrystal body, except using the mixed powder of the $Li_7La_3Zr_2O_{12}$ polycrystal body and the $LiAlO_2$ polycrystal body in place of the mixed powder of the $Li_7La_3Zr_2O_{12}$ polycrystal body and the $Al_2O_3$ polycrystal body.

(Growing 2 of $Li_{6.46}Al_{0.18}La_3Zr_2O_{12}$ Crystal Body)

A $Li_{6.46}Al_{0.18}La_3Zr_2O_{12}$ crystal body was grown in the same manner as the method of "Growing 1 of $Li_{6.46}Al_{0.18}La_3Zr_2O_{12}$ crystal body" above, except using the rod-shaped mixture of the $Li_7La_3Zr_2O_{12}$ polycrystal body and the $LiAlO_2$ polycrystal body in place the mixture of the rod-shaped $Li_7La_3Zr_2O_{12}$ polycrystal body and the $Al_2O_3$ polycrystal body. Thus, even when the aluminum compounds as the raw material were different, the same crystal body was able to be grown.

Example 2

Production of $Li_{6.1}Al_{0.3}La_3Zr_2O_{12}$ Crystal Body (Production of Mixed Powder of Polycrystal Bodies as Raw Material)

First, 7.1588 g of lithium carbonate $Li_2CO_3$ (manufactured by RARE METALLIC Co., LTD., Purity of 99.99%), 12.9254 g of lanthanum oxide $La_2O_3$ (manufactured by RARE METALLIC Co., LTD., Purity of 99.99%), 6.5196 g of zirconium dioxide $ZrO_2$ (manufactured by RARE METALLIC Co., LTD., Purity of 99.99%), and 0.4045 g of γ-type alumina oxide as starting materials were placed in a mortar, and then uniformly mixed by a wet method. For the lanthanum oxide, one which was calcined at 900° C. beforehand was used.

As the molar ratio Li:Al:La:Zr of the metals of the mixture, lithium is 20 mol % excessive as compared with the stoichiometric ratio of $Li_{6.1}Al_{0.3}La_3Zr_2O_{12}$ which is a target substance. More specifically, as the quantity, the chemical composition is equivalent to $Li_{7.32}Al_{0.3}La_3Zr_2O_{12}$. Next, 27 g of the mixture was charged into an alumina crucible with a cover (manufactured by NIKKATO CORPORATION, C5 type). Then, the crucible was placed in a box type electric furnace (manufactured by DENKEN Co., Ltd., Model Number KDF009), and then calcined at 850° C. for 4 hours, whereby mixed powder of the polycrystal bodies was obtained.

(Production of Rod-Shaped Mixture of Polycrystal Bodies)

A rod-shaped mixture of the polycrystal bodies was produced in the same manner as the method for producing the rod-shaped mixture of the $Li_7La_3Zr_2O_{12}$ polycrystal body and the $Al_2O_3$ polycrystal body, except using the mixed powder of the polycrystal bodies as the raw material above in place of the mixed powder of the $Li_7La_3Zr_2O_{12}$ polycrystal body and the $Al_2O_3$ polycrystal body.

(Growing of $Li_{6.1}Al_{0.3}La_3Zr_2O_{12}$ Crystal Body)

Figure 2:
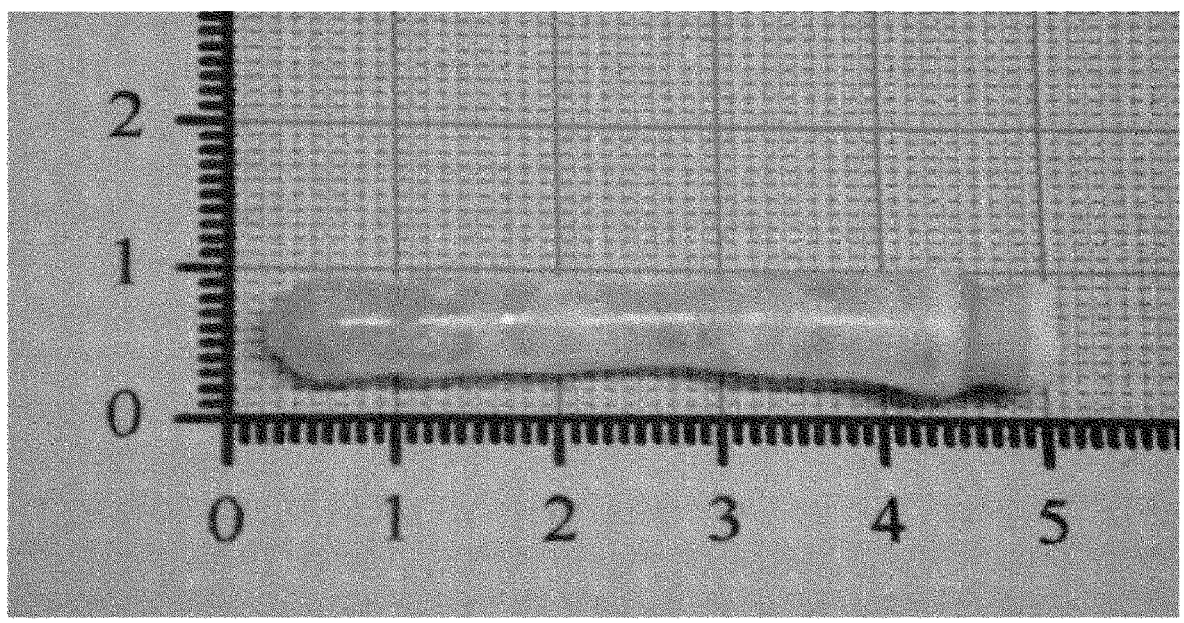
FIG. 2 is a photograph of the appearance of a cubic system $Li_{6.1}Al_{0.3}La_3Zr_2O_{12}$ crystal body obtained in Examples.

A $Li_{6.1}Al_{0.3}La_3Zr_2O_{12}$ crystal body was grown in the same manner as the method of "Growing 1 of $Li_{6.46}Al_{0.18}La_3Zr_2O_{12}$ crystal body" above, except using the rod-shaped polycrystal body above in place of the rod-shaped mixture of the $Li_7La_3Zr_2O_{12}$ polycrystal body and the $Al_2O_3$ polycrystal body. Thus, by the use of the γ-type alumina oxide, the same crystal body was able to be grown from not only the polycrystal body having the same chemical composition as that of the lithium ion conductive crystal body to be produced but the rod-shaped mixture of the polycrystal bodies. FIG. 2 illustrates a photograph of the appearance of the obtained $Li_{6.1}Al_{0.3}La_3Zr_2O_{12}$ crystal body (hereinafter also sometimes referred to as "sample 2"). As illustrated in FIG. 2, the length of the sample 2 was 4 cm.

Example 3

Production of $Li_5La_3Ta_2O_{12}$ Crystal Body (Production of $Li_5La_3Ta_2O_{12}$ Polycrystal Body Powder)

$Li_5La_3Ta_2O_{12}$ polycrystal body powder was produced in the same manner as in Example 1, except using 6.9256 g of lithium carbonate $Li_2CO_3$ (manufactured by RARE METALLIC Co., LTD., Purity of 99.99%), 15.2686 g of lanthanum oxide $La_2O_3$ (manufactured by RARE METALLIC Co., LTD., Purity of 99.99%), and 13.8058 g of tantalum oxide $Ta_2O_5$ (manufactured by RARE METALLIC Co., LTD., Purity of 99.99%) as starting materials. As the molar ratio Li:La:Ta of the metals of the mixture of the raw material, lithium is 20 mol % excessive as compared with the stoichiometric ratio of $Li_5La_3Ta_2O_{12}$ which is a target substance. More specifically, as the quantity, the chemical composition is equivalent to $Li_6La_3Ta_2O_{12}$.

(Production of Rod-Shaped $Li_5La_3Ta_2O_{12}$ Polycrystal Body)

A rod-shaped $Li_5La_3Ta_2O_{12}$ polycrystal body was produced using the $Li_5La_3Ta_2O_{12}$ polycrystal body powder classified in the process above by the following procedure. First, 26 g of the $Li_5La_3Ta_2O_{12}$ polycrystal body powder was charged into a rubber mold, followed by degassing. Next, the mold was placed in water in a state of being sealed, and then held at 40 MPa for 5 minutes. Then, the water pressure was reduced, and then the molded substance was taken out from the mold. The molded substance had a cylindrical shape having a diameter of 1.2 cm and a height of 7 cm. Next, the molded substance was baked at 1150° C. for 8 hours using a box type electric furnace (manufactured by DENKEN Co., Ltd., Model Number KDF009). After the baking, 26 g of a rod-shaped $Li_5La_3Ta_2O_{12}$ polycrystal body close to a column and having a width of 1 cm and a length of 7 cm was obtained.

(Growing of $Li_5La_3Ta_2O_{12}$ Crystal Body)

Figure 3:
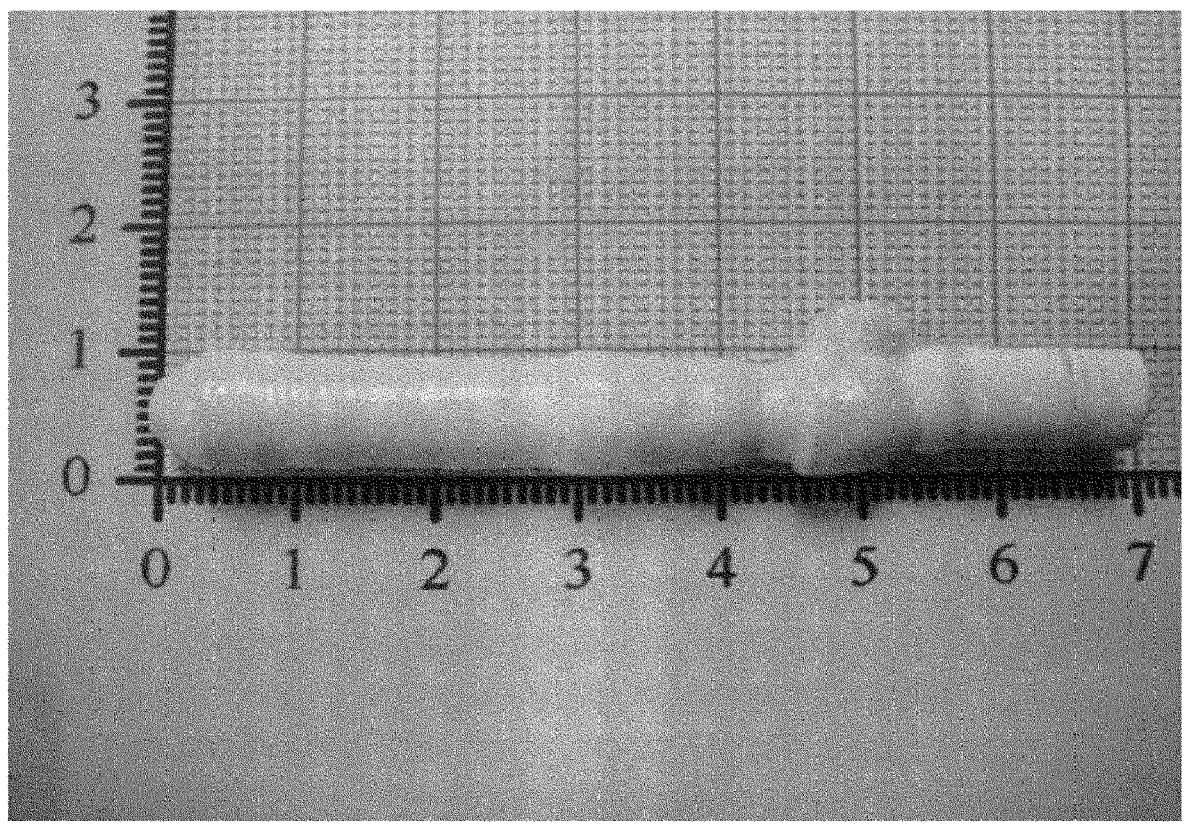
FIG. 3 is a photograph of the appearance of a cubic system $Li_5La_3Ta_2O_{12}$ crystal body obtained in Examples.

A $Li_5La_3Ta_2O_{12}$ crystal body was obtained in the same manner as in Example 1 using the rod-shaped $Li_5La_3Ta_2O_{12}$ polycrystal body. FIG. 3 illustrates a photograph of the appearance of the $Li_5La_3Ta_2O_{12}$ crystal body (hereinafter also sometimes referred to as "sample 3") obtained at a lowering speed of 19 mm/h. As illustrated in FIG. 3, the length of the sample 3 was 4 cm.

Example 4

Production of $Li_6BaLa_2Ta_2O_{12}$ Crystal (Production of $Li_6BaLa_2Ta_2O_{12}$ Polycrystal Body Powder)

$Li_6BaLa_2Ta_2O_{12}$ polycrystal body powder was produced in the same manner as in Example 1, except using 6.8699 g of lithium carbonate $Li_2CO_3$ (manufactured by RARE METALLIC Co., LTD., Purity of 99.99%), 5.0964 g of barium carbonate $BaCO_3$ (manufactured by RARE METALLIC Co., LTD., Purity of 99.99%), 12.6215 g of lanthanum oxide $La_2O_3$ (manufactured by RARE METALLIC Co., LTD., Purity of 99.99%), and 11.4123 g of tantalum oxide $Ta_2O_5$ (manufactured by RARE METALLIC Co., LTD., Purity of 99.99%) as starting materials. As the molar ratio Li:Ba:La:Ta of the metals of the mixture of the starting materials, lithium is 20 mol % excessive as compared with the stoichiometric ratio of $Li_6BaLa_2Ta_2O_{12}$ which is a target substance. More specifically, as the quantity, the chemical composition is equivalent to $Li_{7.2}BaLa_2Ta_2O_{12}$.

(Production of Rod-Shaped $Li_6BaLa_2Ta_2O_{12}$ Polycrystal Body)

A rod-shaped $Li_6BaLa_2Ta_2O_{12}$ polycrystal body was produced using the $Li_6BaLa_2Ta_2O_{12}$ polycrystal body powder classified in the process above by the following procedure. First, 26 g of the $Li_6BaLa_2Ta_2O_{12}$ polycrystal body powder was charged into a rubber mold, followed by degassing. Next, the mold was placed in water in a state of being sealed, and then held at 40 MPa for 5 minutes. Then, the water pressure was reduced, and then the molded substance was taken out from the mold. The molded substance had a cylindrical shape having a diameter of 1.4 cm and a height of 9 cm. Next, the molded substance was baked at 1150° C. for 8 hours using a box type electric furnace (manufactured by DENKEN Co., Ltd., Model Number KDF009). After the baking, 26 g of a rod-shaped $Li_6BaLa_2Ta_2O_{12}$ polycrystal body close to a column and having a width of 1.2 cm and a length of 8 cm was obtained.

(Growing of $Li_6BaLa_2Ta_2O_{12}$ Crystal Body)

Figure 4:
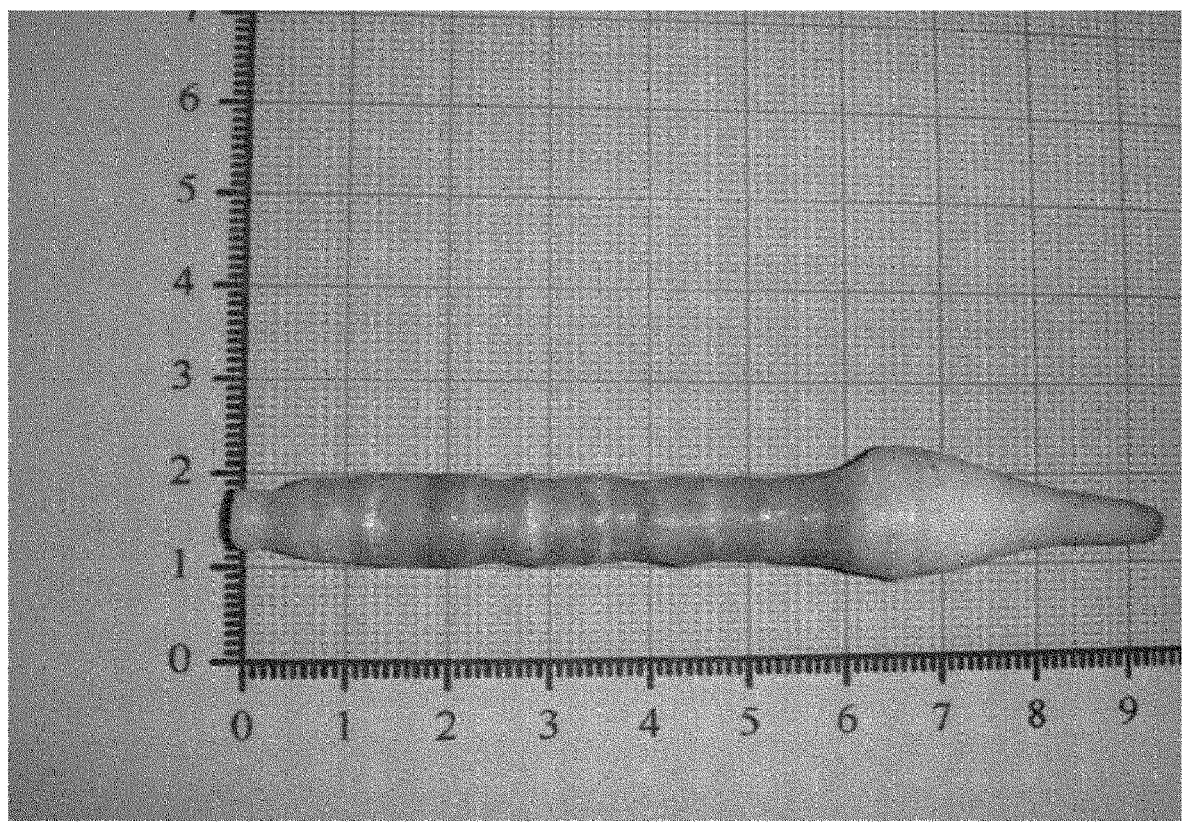
FIG. 4 is a photograph of the appearance of a cubic system $Li_6BaLa_2Ta_2O_{12}$ crystal body obtained in Examples.

A $Li_6BaLa_2Ta_2O_{12}$ crystal body was obtained in the same manner as in Example 1 using the rod-shaped $Li_6BaLa_2Ta_2O_{12}$ polycrystal body. FIG. 4 illustrates a photograph of the appearance of the $Li_6BaLa_2Ta_2O_{12}$ crystal body (hereinafter also sometimes referred to as "sample 4") obtained at a lowering speed of 19 mm/h. As illustrated in FIG. 4, the length of the sample 4 was 6 cm.

Evaluation of Lithium Ion Conductive Crystal Body Obtained in Each Example

The powder X-ray diffraction pattern of the sample 2 was the same as the pattern of $Li_{7-3x}Al_xLa_3Zr_2O_{12}$ of the cubic system garnet-related structure reported until now. The grating constant a calculated from the result of the powder X-ray structure analysis was a=1.30208 nm±0.00004 nm.

Figure 5:
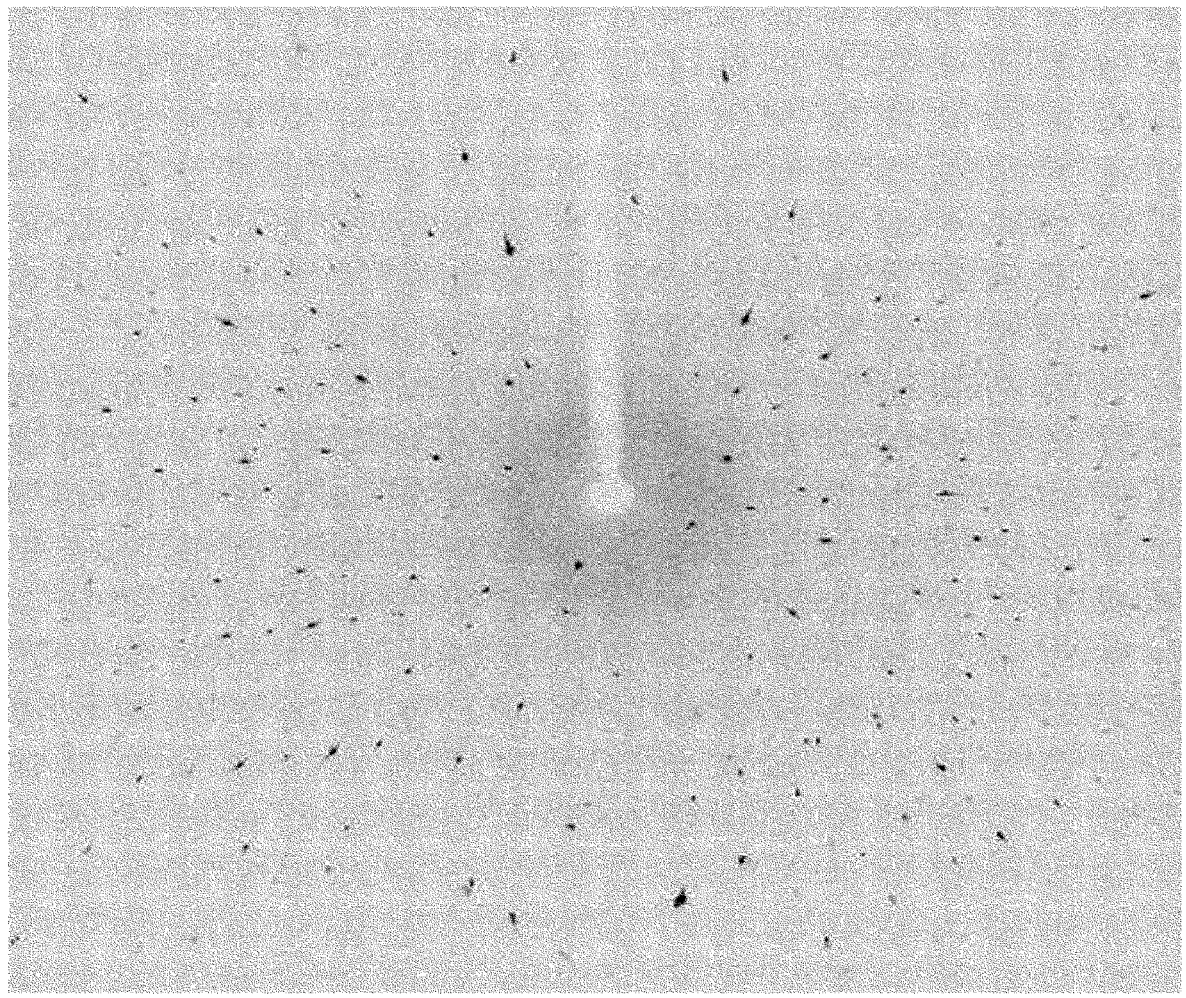
FIG. 5 is a single crystal X-ray diffraction pattern of the cubic system $Li_5La_3Ta_2O_{12}$ crystal body obtained in Examples.
Figure 6:
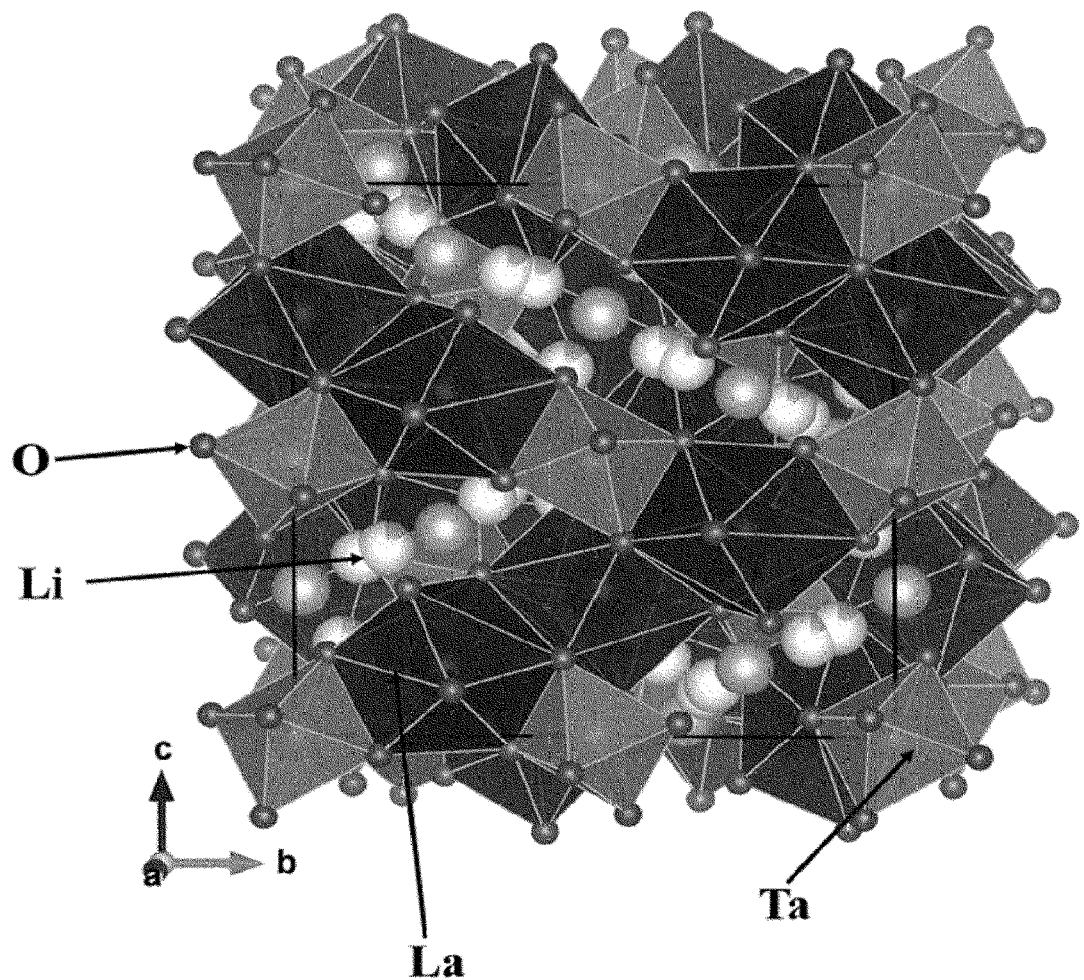
FIG. 6 is a schematic view illustrating a garnet-related type structure of the cubic system $Li_5La_3Ta_2O_{12}$ crystal body obtained in Examples.

The structure of the sample 3 was investigated using a single crystal X-ray diffraction device (manufactured by Rigaku Corporation, R-AXIS RAPID-II). FIG. 5 illustrates the X-ray diffraction pattern of the sample 3. As illustrated in FIG. 5, clear diffraction points were able to be measured. When diffraction intensity data was collected by a program RAPID AUTO attached to the single crystal X-ray diffraction device, and then the crystal structure of the sample 3 was investigated by a crystal structure analysis program Jana 2006, it was found that the sample 3 belongs to a cubic system. As a result of the crystal structure analysis of the sample 3, it was clarified that the crystal structure is the same as that of $Li_5La_3Ta_2O_{12}$ reported before as illustrated in FIG. 6. Since the R factor showing the reliability of the crystal structure analysis of the sample 3 was 2.04%, it can be said that the crystal structure analysis result is appropriate.

When the grating constant a of the sample 2 was determined by a least-squares method using the reflection observed in the single crystal X-ray diffraction measurement, 1.2816 nm±0.003 nm was obtained. It was confirmed from the grating constant that the sample 2 is a lithium composite oxide belonging to the cubic system and having the garnet-related type structure. Thin pieces having a thickness of about 0.1 mm were produced from the sample 3 and the sample 4, and then powder X-ray diffraction measurement was performed using a powder X-ray diffraction device (manufactured by Rigaku Corporation, Smart Lab). As a result, the diffraction pattern of the cubic system garnet-related type compound reported before applied to the thin pieces of the sample 3 and the sample 4.

As a result of calculating the grating constants a1 and a2 of the thin pieces of the sample 3 and the sample 4, the following values were obtained:
Grating constant a1 of Sample 3=1.282227 nm±0.000007 nm;
Grating constant a2 of Sample 4=1.29118 nm±0.00004 nm.

Figure 7:
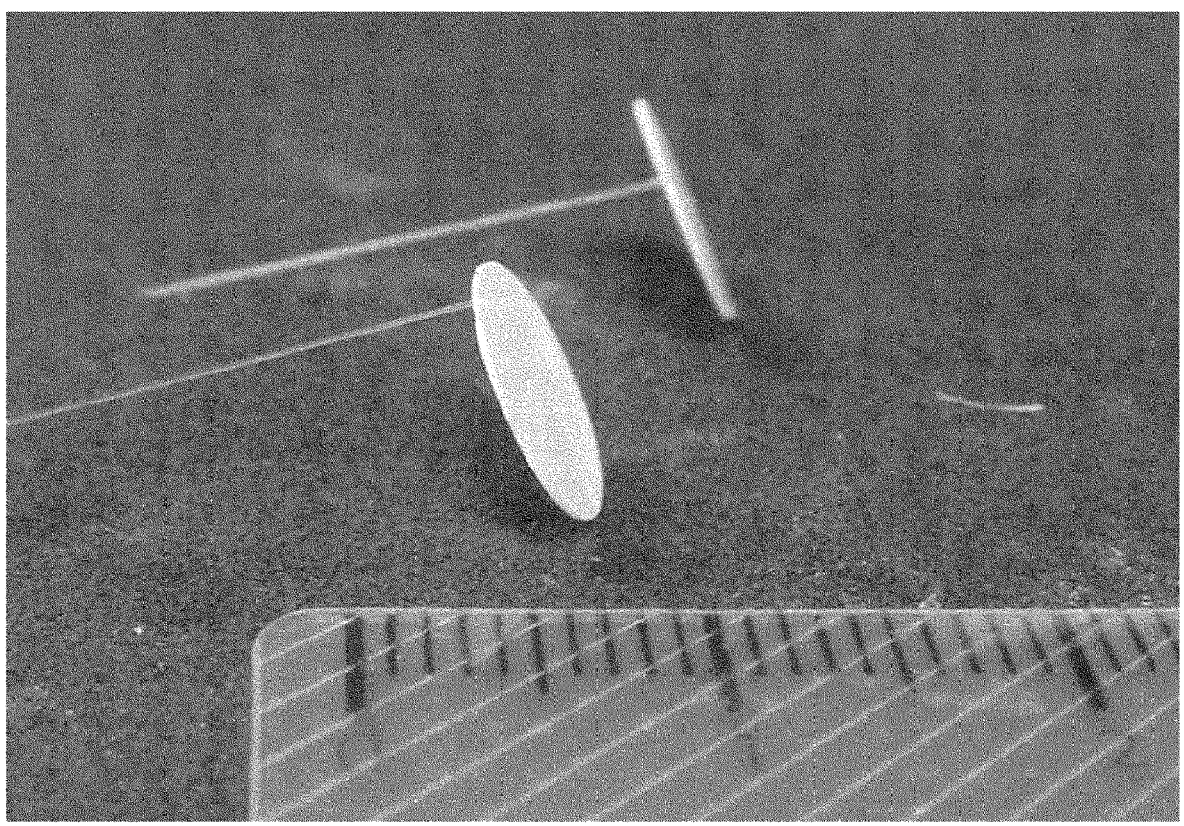
FIG. 7 is a photograph of the appearance of thin pieces of the cubic system $Li_6BaLa_2Ta_2O_{12}$ crystal body obtained in Examples.

As a result of measuring the density of the molded body of the sample 3 at two or more portions, the relative densities were 99.2%, 99.5%, 99.8%, and 100% to the true density calculated from the crystal structure. The relative density of the sample 4 was also 99% or more. When the sample 4 was cut with a diamond cutter, thin pieces having a thickness of 0.3 mm and 0.086 mm were able to be produced as illustrated in FIG. 7. Thus, thin pieces can be obtained, and therefore, when the lithium ion conductive crystal body of this embodiment is used as a solid electrolyte of an all-solid state lithium ion secondary battery, the electrical resistance value of the solid electrolyte can be reduced.

Figure 8:
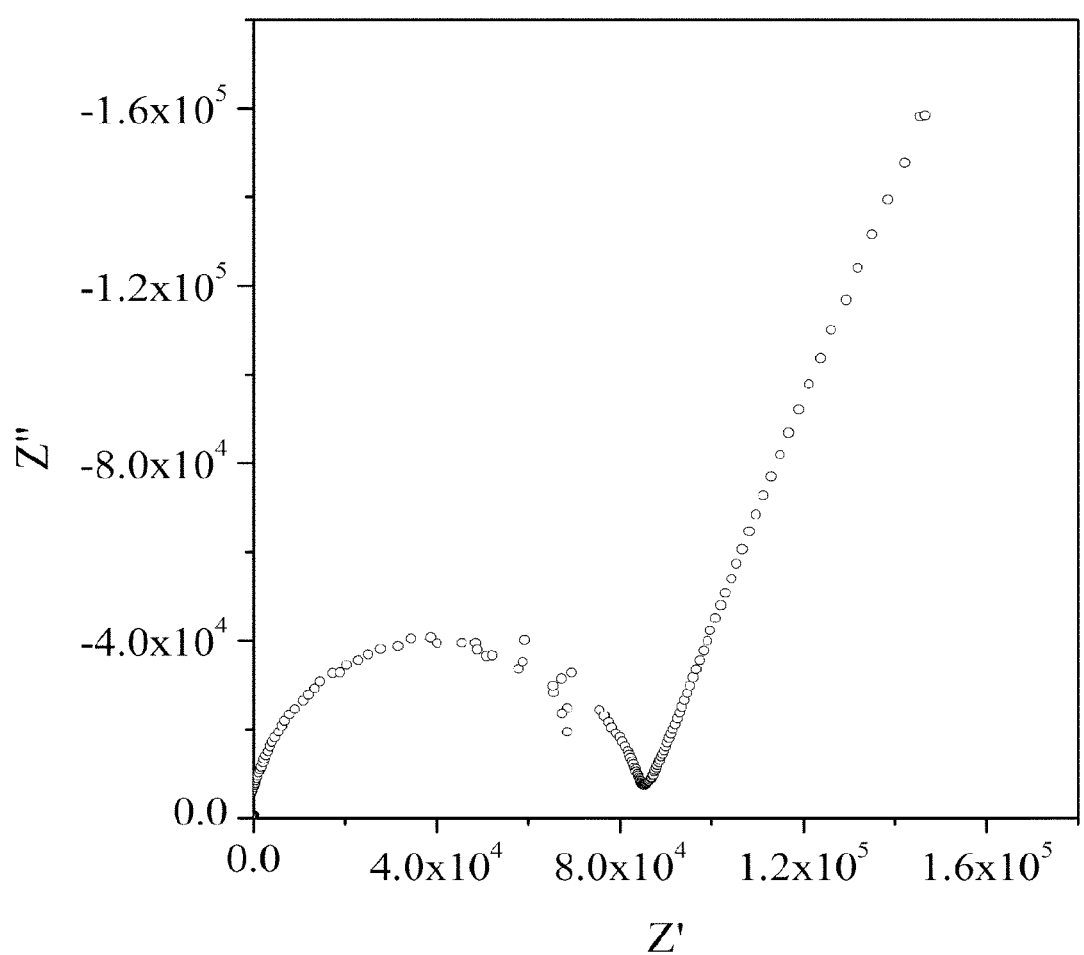
FIG. 8 is the Nyquist plot of the cubic system $Li_{6.1}Al_{0.3}La_3Zr_2O_{12}$ crystal body obtained in Examples.

The sample 2 was cut to produce a thin piece having a diameter of about 0.8 cm and a thickness of about 0.09 cm. 40 nm thick gold of a circle having a diameter of 0.2 cm was sputtered onto the front side and the back side of the thin piece to form an electrode. Then, the impedance of the sample 2 was measured by subjecting the sample to an alternative current impedance method (Measuring device: Solartron, 1260) at 25° C. in a nitrogen atmosphere. FIG. 8 illustrates the Nyquist plot at this time. The lithium ion conductivity was calculated to be $3.3 \times 10^{-5}$ S/cm from the Nyquist plot illustrated in FIG. 8.

INDUSTRIAL APPLICABILITY

The lithium ion conductive crystal body of the present invention is usable for a material of a solid electrolyte of an all-solid state lithium ion secondary battery, for example.

What is claimed is:

1. A method for producing a lithium ion conductive crystal body having a chemical composition represented by $Li_{7-3x}Al_xLa_3Zr_2O_{12}$ (0.05<x<0.50), $Li_5La_3Ta_2O_{12}$, or $Li_6BaLa_2Ta_2O_{12}$, having a relative density of 99% or more, belonging to a cubic system, and having a garnet-related type structure,
the method comprising:
a step of melting at least a part of a raw material of a polycrystal body represented by a same chemical composition as the chemical composition of the lithium ion conductive crystal body to form a melted portion, and then moving the melted portion at a movement speed of 8 mm/h or more.

2. A method for producing a lithium ion conductive crystal body having a chemical composition represented by $Li_{7-3x}Al_xLa_3Zr_2O_{12}$ (0.05<x<0.50), having a relative density of 99% or more, belonging to a cubic system, and having a garnet-related type structure,
the method comprising:
a step of melting at least a part of a raw material containing a polycrystal body having a chemical composition represented by $Li_7La_3Zr_2O_{12}$, belonging to a tetragonal system, and having a garnet-related type structure and at least one of an $Al_2O_3$ polycrystal body and a $LiAlO_2$ polycrystal body to form a melted portion, and then moving the melted portion at a movement speed of 8 mm/h or more.

3. The method for producing a lithium ion conductive crystal body according to claim 1, wherein
the movement speed is 8 mm/h or more and 19 mm/h or less.

4. The method for producing a lithium ion conductive crystal body according to claim 1, wherein
the raw material is melted while rotating the rod-shaped raw material on a plane perpendicular to a longitudinal direction at a rotation speed of 30 rpm or more.

5. The method for producing a lithium ion conductive crystal body according to claim 4, wherein
the rotation speed is 30 rpm or more and 60 rpm or less.

* * * * *